United States Patent [19]

Fujitsugu et al.

[11] Patent Number: 4,669,504

[45] Date of Patent: Jun. 2, 1987

[54] CLOSED LOOP TYPE PROPORTIONAL ELECTROMAGNETIC VALVE FOR HYDRAULIC CONTROL

[75] Inventors: Yutaka Fujitsugu; Tomoo Ito, both of Katsuta; Tadao Uchida, Yamagata, all of Japan

[73] Assignees: Hitachi, Ltd., Tokyo; Hitachi Automotive Engineering Co., Ltd., Ibaraki, both of Japan

[21] Appl. No.: 846,152

[22] Filed: Mar. 31, 1986

[30] Foreign Application Priority Data

Apr. 1, 1985 [JP] Japan .................................. 60-66501

[51] Int. Cl.$^4$ .......................................... F15B 13/044
[52] U.S. Cl. .............................. 137/625.65; 251/50; 251/129.16
[58] Field of Search ............... 137/514.7, 625.65; 251/50, 129.16

[56] References Cited

U.S. PATENT DOCUMENTS

| 2,916,019 | 12/1959 | Murphy | 137/625.65 |
|---|---|---|---|
| 4,250,922 | 2/1981 | Will et al. | |
| 4,316,599 | 2/1982 | Bouvet et al. | 137/625.65 X |
| 4,390,158 | 6/1983 | Lang | |
| 4,535,816 | 8/1985 | Feder et al. | 137/625.65 |
| 4,579,145 | 4/1986 | Leiber et al. | 137/625.65 |

FOREIGN PATENT DOCUMENTS

| 0171998 | 2/1986 | European Pat. Off. | |
|---|---|---|---|
| 3144362 | 5/1983 | Fed. Rep. of Germany | 137/625.65 |
| 49-2217 | 1/1974 | Japan | |

Primary Examiner—Gerald A. Michalsky
Attorney, Agent, or Firm—Antonelli, Terry & Wands

[57] ABSTRACT

A hydraulic control solenoid valve comprising a plunger provided in a coil case and a shaft freely shiftable in a body. The shaft is provided with a first spool valve and a second spool valve. A feedback chamber is provided in the body and on the side of the first spool valve. A round shaped thin plate is fixed to the end of the first spool valve and positioned in the feedback chamber so as to form a constricted part of a flow passage formed between an interior wall of the feedback chamber and a peripheral surface of the thin plate. The cross-sectional area ($S_2$) of the constricted part is not greater than 0.04 of the side surface area ($S_1$) of the thin plate. The thin plate adds the damping coefficient ($C_d$) and also functions as the stabilization of the behavior of the spool valves. The thin plate facilitates the prevention of the resonance phenomenon of the spool valves.

5 Claims, 6 Drawing Figures

CLOSED LOOP TYPE PROPORTIONAL ELECTROMAGNETIC VALVE FOR HYDRAULIC CONTROL

BACKGROUND OF THE INVENTION

The present invention relates to a closed loop type proportional electromagnetic valve for hydraulic control, and, more particularly, to a closed loop type proportional electromagnetic valve for hydraulic control for use in shift control systems of an automatic transmission and a power steering unit of the like of a motor vehicle, with the valve sliding spool valves controlled by an electromagnet wherein a resonance check structure for the sliding spool valves is improved.

A closed loop type proportional electromagnetic valve for hydraulic control includes a hydraulic control solenoid valve which represents an important device in the hydraulic control system for the motor vehicle, with the hydraulic control solenoid valve being adapted to be employed for controlling an automatic transmission and a power steering unit of the like in a motor vehicle.

In automatic transmission system for the motor vehicle, the throttle sensor detects the opening degree of the accelerator, and the signals from the various sensors are processed through a microprocessor. The hydraulic control solenoid valve, receiving an appropriate signal from the driver controls the main regulator and varies the line pressure fluid, with the line pressure fluid being transmitted to a friction element through the shift solenoid. By this regulated line pressure fluid, the torque to the wheels can be smoothly transmitted.

In, for example, U.S. Pat. No. 4,250,922, a conventional closed loop type proportional electromagnetic valve for hydraulic control for use in connection with an automatic transmission system of a motor vehicle is proposed.

The electromagnetically operated control valve assembly or the hydraulic control solenoid valve includes an electromagnet and a valve unit. The end portion of a plunger which projects into a valve sleeve forms a sliding spool of the valve unit. The inlet port is connected to the main line pressure fluid of the shift control system of a motor vehicle, whereas, the outlet port leads to the conduit supplying a regulated line pressure fluid to the coupling members of the automatic transmission. The exhaust port opens in a pressure free space.

However, with the above proposed structure, the electromagnetically operated control valve assembly, because the flow of the line pressure fluid flowing from the inlet port is changed by the portion of the sliding spool valves, the force of the line pressure fluid is applied to the sliding spool valves in their axial direction so that the balance of forces becomes unstable and therefore the resonance phenomenon of the movable parts is generated.

When the direction of the flow of the line pressure fluid flowing in from the inlet port is changed by the portion of the sliding spool valve, the line pressure fluid force is applied to the direction of the armature. This force makes the balance mentioned above unstable and produces the resonance phenomenon. This resonance phenomenon occurs over an entire stroke of the movement of the sliding spool valves. The self-excited vibration or the resonance phenomenon of the sliding spool valves results in a number of problems.

The resonance phenomenon occurs in the small control current domain, namely, in the relatively high output-pressure domain. Then the valve of the output-pressure varies largely and the line pressure fluid control becomes impossible.

The resonance frequency of the hydraulic control solenoid valve is governed by the specific frequency of a system having a single degree of freedom and is determined by the weight of the movable parts and a spring constant of the spring, usually 30 - 100 Hz. It is functionally impossible to change the weight of the movable parts and the spring constant of the spring substantially.

In for example, Japanese Patent Publication No. 2217/1974, a method for preparing or adding a damping action is proposed in order to solve the unstable balance of forces and the resonance phenomenon of the movable parts of the hydraulic control solenoid valve for the motor vehicle.

In above Japanese patent publication, an electromagnetically operated control sliding spool valve or the hydraulic control solenoid valve includes a movable armature of the plunger having a hole therethrough, with the through hole being provided in the movable armature providing the damping effect to the movable armature of the plunger.

However, to realized this method, a chamber for a movable armature of the plunger must be fully filled with line pressure fluid. Further, because the damping effect is obtained by a clearance between the electromagnetic coil portion and the periphery of the movable armature and the dimensions of the through hole of the movable armature, the structure of the plunger portion becomes complicated and further the dimensions on the design of the plunger portion which are necessary to determine an attraction force are restricted.

An object of the present invention resides in providing a closed loop type proportional electromagentic valve for hydraulic control wherein the resonance phenomenon of the sliding spool valves can be prevented.

Another object of the present invention resides in providing a closed loop type proportional electromagnetic valve for hydraulic control wherein the dimensions on the design of the plunger are not restricted.

In accordance with the present invention a closed loop type proportional electromagnetic valve for hydraulic control is provided which includes a coil case, a body fixed to the coil case, a coil provided the coil case, a spring provided the coil case, a plunger provided the coil case, with the coil being provided in such manner that the coil attracts the plunger against the tension of the spring at the time of excitation. A shaft is provided in the body in such a manner that the shaft is freely shiftable therein, a first sliding spool valve and a second sliding spool valve are provided with the shaft. An inlet, exhaust and outlet port are provided in the body, with the first sliding spool valve and the second sliding spool valve closing and opening the inlet port and the exhaust port. The outlet port is communicated with the shaft between the first sliding spool valve and the second sliding spool valve, and a feedback chamber is provided in the body and is communicated with the shaft through a feedback channel. The feedback chamber has a larger diameter than a diameter of the first sliding spool valve and an end portion of the first sliding spool valve opposite the second sliding spool valve protrudes into the feedback chamber.

For this purpose a damping means is fixed to the end portion of the first sliding spool valve and is positioned in the feedback chamber so as to form a constricted part of a flow passage formed between an inside wall of the feedback chamber and a peripheral surface of the damping means.

The ratio of areas of a cross-sectional area of the constricted part of the flow passage and a side surface area of the damping member is defined so as to be between a ratio of areas of an upper limit of the practical response time and a ratio of areas of less than a resonance domain.

A closed loop type of proportional electromagnetic valve for hydraulic control of the present invention facilitates prevention of the resonance phenomenon of the sliding spool valves and at the same time removes restrictions on the design from the dimensions of the plunger.

The hydraulic control solenoid valve for the motor vehicle has a pair of sliding spool valves. According to the results of the experimentation and analysis, it has been determined that the addition of the damping coefficient ($C_d$) acted on the sliding portion of the sliding spool valve is available to stabilize the behavior of the sliding spool valves.

For the addition of the damping coefficient ($C_d$), it has been determined that it is possible to provide a damping mechanism or a damping means with the end portion of one of the sliding spool valve positioned in the feedback chamber which is filled with the line pressure fluid or the pressure oil. The damping mechanism or the damping means gives the damping effect to the sliding spool valves and also functions as the stabilization of the behavior of the sliding spool valves.

DETAILED DESCRIPTION

Figure 1:
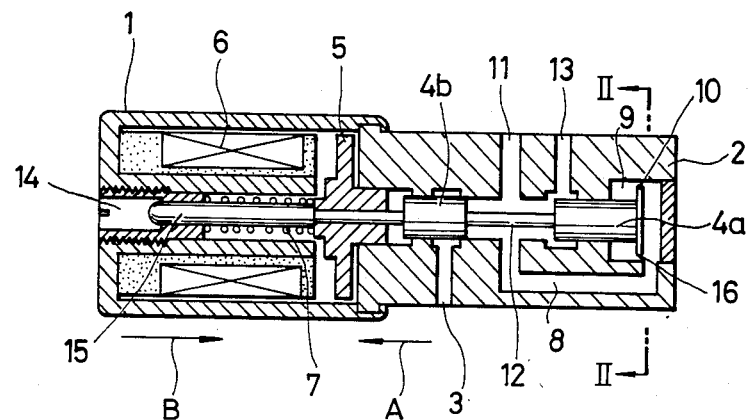
FIG. 1 is a vertical sectional view of an embodiment of a closed loop type proportional electromagnetic valve for hydraulic control of the present invention.
Figure 2:
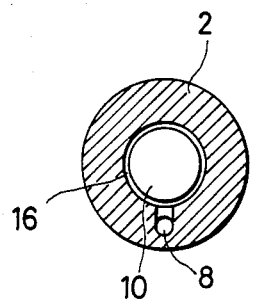
FIG. 2 is a sectional view of taken along with a line II—II of FIG. 1.

Referring now to the drawings wherein like reference numerals are used throughout the various views to designate like parts and, more particularly, to FIGS. 1 and 2, according to these figures, an electromagnetic valve of a closed loop type proportional electromagnetic valve for forming a hydraulic control solenoid valve for a motor vehicle is proposed which includes a body 2 fixed to a coil case 1, with a coil 6, a spring 7 and a plunger 5 being provided in the coil case 1. The plunger 5 is so formed as to be attracted by an excitation of the coil 6 against the tension of the spring 7 at the time of excitation. A shaft 12, having a first and second sliding spool valve 4a and 4b, is provided in the body 2 so as to shift freely in the axial direction.

The first sliding spool valve 4a and the second sliding spool valve 4b are fixed to respective ends the shaft 12. The first sliding spool valve 4a and the second sliding spool valve 4b open and close an inlet port 13 and an exhaust port 3, respectively. The inlet port 13 and the exhaust port 3 are opened into the body 2.

An outlet port 11 is also provided in the body 2 and is communicated with the peripheral portion of the shaft 12 between the first sliding spool valve 4a and the second sliding spool valve 4b. The diameter of the peripheral portion of the shaft 12 is smaller than the diameters of the first sliding spool valve 4a and the second sliding spool valve 4b.

A feedback chamber 9 is provided in the end portion of the body 2, with the end portion of the first sliding spool valve 4a opposite to the second sliding spool valve 4b protruding into the feedback chamber 9.

A round shape thin metal plate 10, acting as a damping means, is fixed to the protruding end portion of the first sliding spool valve 4a and is positioned in the feedback chamber 9.

The feedback chamber 9 has a larger diameter than a diameter of the first sliding spool valve 4a and is communicated with the peripheral portion of the shaft 12 through a feedback channel 8. The feedback channel 8 is provided in the body 2 and is communicated with the outlet port 11. The shaft 12 may be integrally formed with the shaft 15 having the plunger 5.

A thrust bearing 14 supports the shafts 15 so as to make it slide freely in the axial direction. The shaft 15 is formed with a large diameter shaft portion and a small diameter shaft and is solidly inserted in the plunger 5 in a central portion thereof. The end portion of the small diameter shaft portion of the shaft 15 contacts with the end portion of the second sliding spool valve 4b.

A constricted part or mechanism 16 of the flow passage for the line pressure fluid in the feedback chamber 9 is defined by an outer peripheral surface of the round thin plate 10 and a cylindrical interior wall of the feedback chamber 9. A cross-sectional area ($S_2$) of the constricted part 16 of the flow passage is so defined as to be not more than 0.04 of the side surface area ($S_1$) of the thin plate 10.

With the above construction, an input flow of the line pressure fluid or the pressure oil from the inlet port 13 is determined by the position of the first sliding spool valve 4a which slides in the body 2. A leakage flow from the exhaust port 3 is determined from the position of the second sliding spool valve 4b which slides in the body 2. A predetermined reduced line pressure fluid is put out from the outlet port 11. The predeteremined reduced line pressure fluid is supplied to the feedback chamber 9 through the feedback channel 8.

The first sliding spool valve 4a is pushed in a direction of an arrow A by the line pressure fluid supplied to the feedback chamber 9. The shaft 12 is attracted in a direction of the arrow A by the plunger 5 attracted by the coil 6. The first sliding spool valve 4a and the shaft 12 shift until the resultant force of above two forces is balanced with the reactive force of the spring 7 in the direction of an arrow B.

If the output flow of the line pressure fluid is reduced due to the increase of flow at the outlet port 11 or for any other reasons, the line pressure fluid supplied to the feedback chamber 9 is also reduced and the balance is lost so that the first sliding spool valve 4a and the second sliding spool valve 4b are shifted in the direction of the arrow B.

Therefore, an input quantity of the line pressure fluid from the inlet port 13 is increased and a leakage quantity of the line pressure fluid from the exhaust port 3 is reduced. As a result, the first sliding spool valve 4a and the second sliding spool valve 4b are shifted until the value of the line pressure fluid in the feedback chamber 9 reaches a predetermined value.

In this case, the movement of the line pressure fluid in the feedback chamber 9 is restricted by the constricted part 16 between the peripheral surface of the thin plate 10 and the interior wall of the feedback chamber 9 and thereby the damping action is effected.

The resonance frequency is governed by the specific frequency of a system having a single degree of freedom and is determined by the weight of the plunger 5 and a spring constant of the spring 7, although it is functionally impossible to substantially change the weight of the plunger 5 and the spring constant of the spring 7.

In accordance with the present invention, the damping action is applied to the first sliding spool valve 4a by the constricted part 16 defined by the outer peripheral surface of the thin plate 10 and the inside wall of the feedback chamber 9 and the resonance frequency does not reach the specific frequency of the system having the single degree of freedom, therefore, the resonance phenomenon is avoided.

Figure 3:
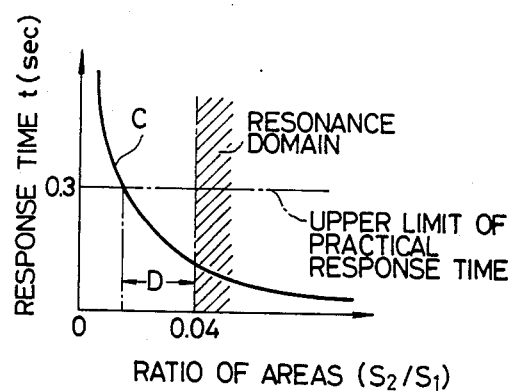
FIG. 3 is a graphical illustration of a relationship between a ratio of a sectional area of a constricted part surrounding a thin plate and a side surface area of the thin plate and response time of the closed loop type proportional electromagnetic valve for hydraulic control shown in FIG. 1.

FIG. 3 shows the response time (t) of the output line pressure which reaches the predetermined line pressure from the optional output line pressure in this embodiment with the ratio of areas ($S_2/S_1$) of the cross-sectional area ($S_2$) of the constricted part 16 and the side surface area ($S_1$) of the thin plate 10 as an abscissa and the response time as an ordinate.

In FIG. 3, the hatched area represents the resonance domain and the upper limit of the response time (t) is 0.3 second. The respond time (t) longer than 0.3 second is not practical. A curve C represents a response time curve. The response time curve C is the result of the experiment and if the ratio of the areas ($S_2/S_1$) is more than 0.04, the response time curve C enters the resonance domain and the hydraulic control solenoid valve can not be operated. Thus the ratio of the areas ($S_2/S_1$) must not exceed 0.04.

However, if the ratio of areas ($S_2/S_1$) is much smaller than 0.04, the response time curve C crosses over the upper limit of the practical response time (0.3 second). Therefore, if the value is used by applying the portion D shown in FIG. 3 of the response time curve C below the response time (0.3 second) with the ratio of the areas ($S_2/S_1$) less than that of the resonance domain, the output line pressure can be controlled from the optional output line pressure to the predetermined line pressure steadily without producing the resonance phenomenon and the dimensions on the design of the plunger 5 are not restricted.

As in the closed loop type proportional electromagnetic valve for hydraulic control of the present invention, the thin plate 10 is fixed to an end portion of the first sliding spool valve 4a in the feedback chamber 9 and the constricting part or mechanism 16 of the line pressure fluid is provided in the feedback chamber 9 by making the ratio of areas ($S_2/S_1$) of the cross-sectional area ($S_2$) defined by the perpheral part of the thin plate 10 and the inside wall of the feedback chamber 9 and the side surface area ($S_1$) of the thin plate 10 not more than 0.04 to give the first spool sliding valve 4a the damping action.

Accordingly the resonance phenomenon caused by the vibration of the second sliding spool valve 4b due to the force of line pressure fluid flowing in from the inlet port 13 is avoided, and the dimensions on the design of the plunger 5 are not restricted.

Figure 4:
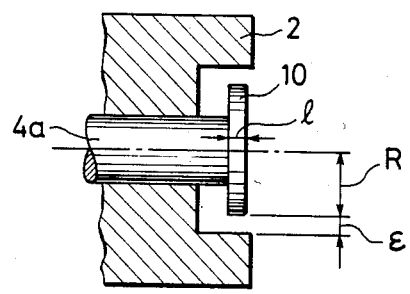
FIG. 4 is a cross-sectional detail view, on an enlarged scale, of the damping mechanism provided with the closed loop type proportional electromagnetic valve for hydraulic control.

FIG. 4 provides a detail view of an arrangement of the damping mechanism such as the thin plate 10 attached to a sliding spool valve 4a. In a hydraulic control solenoid valve having a round thin damping plate 10, the damping coefficient ($C_d$) is defined in accordance with the following relationship:

$$C_d = \frac{6\mu l A^2}{\pi R \epsilon^3}$$

$\mu$: coefficient of viscosity
$l$: thickness of the thin plate 10
$A$: side surface area of the thin plate 10
$R$: radius of the round thin plate 10
$\epsilon$: clearance between the insdie wall surface of the body 2 and the peripheral surface of the thin plate 10

Figure 6:
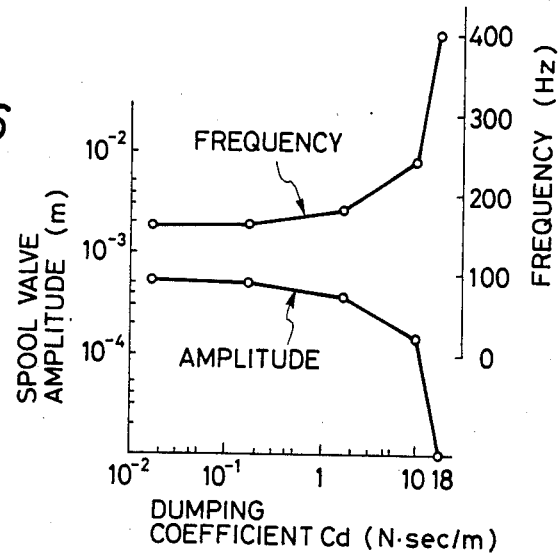
FIG. 6 is a graphical illustration of a relationship between a damping coefficient ($C_d$), and a sliding spool valve amplitude and the resonance frequency.

When the damping coefficient ($C_d$) is added to the sliding spool valve 4a of the hydraulic control solenoid valve for the motor vehicle, the results of the calculation is shown in FIG. 6. FIGS. 6 shows the relationship between the damping coefficient ($C_d$), and the sliding spool valve amplitude and the resonance frequency.

According to the increasee of the newly added damping coefficient ($C_d$), the resonance frequency becomes to increase and the other hand the sliding spool valve amplitude becomes to decrease. When the valve of the damping coefficient ($C_d$) becomes more than 18 N.sec/m, the self-excited vibration or the resonance phenomenon of the hydraulic control solenoid valve disappear entirely therefrom.

Figure 5:
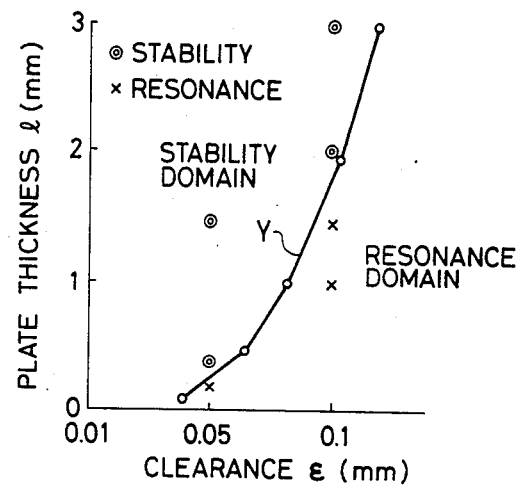
FIG. 5 is a graphical illustration of relationship between the clearance ($\epsilon$) and a thickness (l) of the thin plate.

FIG. 5 shows the results of the resonance illustrating the relationship of the clearance ($\epsilon$), which is a gap between the inside wall surface of the body 2 and the peripheral surface of the round shape thin plate 10, and the thickness ($l$) of the thin plate 10. The curve Y indicates the curve showing introduced according to the results of the calculation.

The results of the experimentation are consistent substantially with the results of the calculation. When the clearance or the gap ($\epsilon$) is 0.1 mm, and further the thickness ($l$) of the thin plate 10 is more than 2 mm, the resonance phenomenon disappears.

The large clearance ($\epsilon$) is desirable from the standpoints of manufacturing of the hydraulic control solenoid valve, but the larger clearance ($\epsilon$) needs the larger thickness ($l$) of the thin plate 10. However, the larger thickness ($l$) of the thin plate 10 is apt to be influnced by the viscosity of the line pressure fluid, so that small thickness ($l$) of the thin plate 10 is desirable.

Accordingly, in the above damping mechanism for the hydraulic control solenoid valve of the present invention, the dimension of the clearance ($\epsilon$) is defined as to be 0.1 mm and the dimension of the thickness ($l$) of the thin plate 10 is defined as to be 2 mm.

The hydraulic control solenoid valve having above the damping mechanism generates no resonance phenomenon, and also satisfies the requirements of another various characteristics.

What is claimed is:

1. A closed loop type proportional electromagnetic valve for hydraulic control, the valve comprising; a coil case; a body fixed to said coil case; a coil provided said coil case; a spring provided in said coil case; a plunger provided in said coil case; said coil attracts said plunger against a tension of said spring upon excitation of said coil; a shaft provided in said body in such a manner that said shaft is freely shiftable in said body; a first sliding spool valve and a second sliding spool valve provided with said shaft; an inlet port provided in said body; an exhaust port provided in said body; an outlet port provided in said body; said first sliding spool valve and said second sliding spool valve closing and opening said inlet port and said exhaust port; said output port communicates with said shaft between said first sliding spool valve and said second sliding spool valve; a feedback chamber provided in said body and in communication with said shaft through a feedback channel; said feedback chamber has a larger diameter than a diameter of said first sliding spool valve and an end portion of said first sliding spool valve opposite said second sliding spool valve protrudes into said feedback chamber;

a damping means is fixed to the end portion of said first sliding spool valve and is positioned in said feedback chamber so as to form a constricted part of a flow passage formed between an interior wall of said feedback chamber and a peripheral surface of said damping means.

2. A closed loop type proportional electromagnetic valve for hydraulic control according to claim 1, wherein said damping means includes a plate member.

3. A closed loop type proportional electromagnetic valve for hydraulic control according to claim 2, wherein a ratio of areas ($S_2/S_1$) of a cross-sectional area ($S_2$) of said constricted part of the flow passage and a side surface area ($S_1$) of said plate member is between a ratio of areas ($S_2/S_1$) of an upper limit of a practical response time and a ratio of areas ($S_2/S_1$) of less than a resonance domain.

4. A closed loop type proportional electromagnetic valve for hydraulic control according to claim 3, wherein the cross-sectional area ($S_2$) of said constricted part of the flow passage is not greater than 0.04 of the side surface area ($S_1$) of said plate member.

5. A closed loop type proportional electromagnetic valve for hydraulic control according to claim 4, wherein the interior wall of said feedback chamber is formed cylindrically, and the peripheral surface of said plate member is formed in a round shape.

* * * * *